United States Patent
Uchiumi et al.

(10) Patent No.: US 9,827,752 B2
(45) Date of Patent: Nov. 28, 2017

(54) LAMINATE FILM MANUFACTURING METHOD

(71) Applicant: FUJIFILM Corporation, Tokyo (JP)

(72) Inventors: Kyouhisa Uchiumi, Kanagawa (JP); Shinji Hikita, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/219,688

(22) Filed: Jul. 26, 2016

(65) Prior Publication Data

US 2016/0332431 A1 Nov. 17, 2016

Related U.S. Application Data (63) Continuation of application No. PCT/JP2015/053772, filed on Feb. 12, 2015.

(30) Foreign Application Priority Data

Feb. 13, 2014 (JP) ................................ 2014-025704
Oct. 9, 2014 (JP) ................................ 2014-207673

(51) Int. Cl.
  *B32B 37/00* (2006.01)
  *B29C 65/14* (2006.01)
  (Continued)

(52) U.S. Cl.
  CPC ...... *B32B 37/0053* (2013.01); *B29C 35/0277* (2013.01); *B29C 35/0805* (2013.01);
  (Continued)

(58) Field of Classification Search
  CPC ............ B29C 65/1403; B29C 35/0805; B29C 2035/0827; B29C 65/525; B29C 65/488;
  (Continued)

(56) References Cited

U.S. PATENT DOCUMENTS

2014/0103798 A1* 4/2014 Yamanaka ............. H05B 33/04
                                                             313/512
2014/0170424 A1* 6/2014 Honda ................... B05D 3/007
                                                             428/446

FOREIGN PATENT DOCUMENTS

CN    101104329 A    1/2008
JP    09-024571 A    1/1997
(Continued)

OTHER PUBLICATIONS

Machine translation of WO2013051554.*
(Continued)

*Primary Examiner* — Vishal I Patel
(74) *Attorney, Agent, or Firm* — Edwards Neils LLC; Jean C. Edwards, Esq.

(57) ABSTRACT

A laminate film manufacturing method is capable of preventing thickness unevenness of a cured layer and preventing wrinkling of the entire laminate film. A laminate film is manufactured by applying a coating solution including an active radiation curable resin to a surface of a first film that is continuously transported in an application part to form a coated film in a lamination part, laminating a second film that is continuously transported on the coated film to sandwich the coated film between the first film and the second film, and in a state in which the coated film is sandwiched between the first film and the second film, winding the first film around a backup roller and irradiating the coated film with infrared rays from an ultraviolet irradiation device while continuously transporting the first film to cure the coated film in a curing part so as to form a cured layer.

13 Claims, 2 Drawing Sheets

(51) Int. Cl.
| | |
|---|---|
| *B29C 65/48* | (2006.01) |
| *B29C 65/52* | (2006.01) |
| *B29C 65/78* | (2006.01) |
| *B32B 37/06* | (2006.01) |
| *B32B 37/20* | (2006.01) |
| *B29C 35/08* | (2006.01) |
| *B29C 35/02* | (2006.01) |
| B29C 65/00 | (2006.01) |
| B29K 1/00 | (2006.01) |
| B32B 37/12 | (2006.01) |
| B32B 38/00 | (2006.01) |
| B29K 105/16 | (2006.01) |
| B29K 667/00 | (2006.01) |

(52) U.S. Cl.
CPC ...... *B29C 65/1403* (2013.01); *B29C 65/1435* (2013.01); *B29C 65/1454* (2013.01); *B29C 65/488* (2013.01); *B29C 65/4845* (2013.01); *B29C 65/4875* (2013.01); *B29C 65/524* (2013.01); *B29C 65/525* (2013.01); *B29C 65/7894* (2013.01); *B29C 66/1122* (2013.01); *B29C 66/45* (2013.01); *B29C 66/7234* (2013.01); *B29C 66/834* (2013.01); *B29C 66/83415* (2013.01); *B32B 37/0007* (2013.01); *B32B 37/06* (2013.01); *B32B 37/203* (2013.01); *B29C 65/1406* (2013.01); *B29C 65/1467* (2013.01); *B29C 66/71* (2013.01); *B29C 66/72321* (2013.01); *B29C 66/72325* (2013.01); *B29C 66/72341* (2013.01); *B29C 2035/0827* (2013.01); *B29K 2001/08* (2013.01); *B29K 2105/162* (2013.01); *B29K 2667/003* (2013.01); *B32B 38/1875* (2013.01); *B32B 2037/1253* (2013.01); *B32B 2307/414* (2013.01); *B32B 2307/7244* (2013.01); *B32B 2309/02* (2013.01); *B32B 2310/0831* (2013.01); *B32B 2457/12* (2013.01); *B32B 2457/14* (2013.01); *B32B 2457/20* (2013.01)

(58) Field of Classification Search
CPC .......... B29C 65/1406; B29C 66/83415; B29C 66/72325; B29C 66/834; B29C 35/0277; B29C 65/1435; B29C 65/1454; B29C 65/1467; B29C 65/4845; B29C 65/4875; B29C 65/524; B29C 65/7894; B29C 66/1122; B29C 66/45; B29C 66/71; B29C 66/72321; B29C 66/7234; B29C 66/72341; B29K 2667/003; B29K 2105/162; B29K 2001/08; B29K 2023/38; B29K 2067/003; B29K 2069/00; B29K 2033/12; B29K 2033/08; B32B 2310/0831; B32B 2037/1253; B32B 37/06; B32B 37/0007; B32B 37/0053; B32B 37/203; B32B 38/1875; B32B 2307/414; B32B 2307/7244; B32B 2309/02; B32B 2457/12; B32B 2457/14; B32B 2457/20
See application file for complete search history.

(56) References Cited

FOREIGN PATENT DOCUMENTS

| | | | |
|---|---|---|---|
| JP | 2007-090803 A | 4/2007 | |
| JP | 2011-225002 A | 11/2011 | |
| JP | 2013-092766 A | 5/2013 | |
| WO | WO 2013051554 A1 * | 4/2013 | ......... B32B 37/1284 |
| WO | 2013/191095 A1 | 12/2013 | |

OTHER PUBLICATIONS

International Search Report issued in PCT/JP2015/053772 dated Mar. 17, 2015.
Written Opinion issued in PCT/JP2015/053772 dated Mar. 17, 2015.
International Preliminary Report on Patentability issued in PCT/JP2015/053772 dated Jun. 24, 2015.
Office Action, issued by the State Intellectual Property Office of the People's Republic of China dated May 24, 2017, in connection with corresponding Chinese Patent Application No. 201580008377.4.

* cited by examiner

LAMINATE FILM MANUFACTURING METHOD

CROSS-REFERENCE TO RELATED APPLICATIONS

This application is a Continuation of PCT International Application No. PCT/JP2015/053772 filed on Feb. 12, 2015, which was published under PCT Article 21(2) in Japanese, and which claims priorities under 35 U.S.C. §119(a) to Japanese Patent Application No. 2014-025704 filed on Feb. 13, 2014 and Japanese Patent Application No. 2014-207673 filed on Oct. 9, 2014. The above applications are hereby expressly incorporated by reference, in their entirety, into the present application.

BACKGROUND OF THE INVENTION

1. Field of the Invention

The present invention relates to a laminate film manufacturing method.

2. Description of the Related Art

Laminate films composed of plural films such as gas barrier films, protective films, optical filters, and anti-reflection films are used in various devices such as optical elements, display devices such as liquid crystal displays and organic EL displays, semiconductor devices, and thin-film solar cells. Various methods have been proposed as methods for manufacturing these laminated films.

For example, JP1997-024571A (JP-H09-024571A) discloses a laminate film manufacturing method including supplying a base film and a first mold film to a pair of rollers arranged in parallel with an interval therebetween, discharging an ultraviolet curable resin liquid toward the interval between the rollers and rotating the both rollers in a direction in which the rollers engage with each other such that the ultraviolet curable resin liquid is sandwiched between the base film and the first mold film, and performing irradiation with ultraviolet rays in the sandwiched state so as to cure the resin liquid.

SUMMARY OF THE INVENTION

However, in the method of JP1997-024571A (JP-H09-024571A), there arises a problem of thickness unevenness occurring in the cured layer or wrinkling occurring in the entire laminate film.

The present invention has been made in consideration of the above circumstances, and an object thereof is to provide a laminate film manufacturing method capable of preventing thickness unevenness of a cured layer and preventing wrinkling of the entire laminate film.

A laminate film manufacturing method of an embodiment comprises at least: a step of applying a coating solution including an active radiation curable resin to a surface of a first film that is continuously transported to form a coated film; a step of laminating a second film that is continuously transported on the coated film to sandwich the coated film between the first film and the second film; and a step of, in a state in which the coated film is sandwiched between the first film and the second film, winding either of the first film and the second film around a backup roller and irradiating the coated film with active radiation while continuously transporting the first film or the second film to cure the coated film so as to form a cured layer.

It is preferable that a difference between the temperature of the first film and the second film before the coated film is irradiated with the active radiation and the temperature of the first film and the second film after the coated film is irradiated with the active radiation is 25° C. or less.

It is preferable that when any of the first film and the second film comes into contact with the backup roller, a difference between the temperature of the backup roller and the temperature of the first film or a difference between the temperature of the backup roller and the temperature of the second film is 25° C. or less.

It is preferable that the temperature of the first film and the second film is equal to or lower than the glass transition temperature thereof.

It is preferable that at least one of the first film or the second film is a barrier film provided with a barrier layer, and the barrier film is provided with a barrier layer having an oxygen transmission rate of 1.00 $cm^3/(m^2 \cdot day \cdot atm)$ or less. The value of 1.00 $cm^3/(m^2 \cdot day \cdot atm)$ corresponds to $9.87 \times 10^{-6}$ $ml/(m^2 \cdot day \cdot Pa)$.

It is preferable that at least one of the first film or the second film is provided with a hard coat layer.

It is preferable that the coating solution includes at least one of a quantum dot or a quantum rod.

It is preferable that the barrier layer is an inorganic film including at least one compound selected from silicon nitride, silicon oxynitride, silicon oxide, and aluminum oxide.

It is preferable that at least one of the first film or the second film is provided with a light diffusing layer.

It is preferable that the viscosity of the coating solution is within a range of 40 mPa·s to 400 mPa·s.

According to the manufacturing method, it is possible to prevent thickness unevenness of a cured layer and prevent wrinkling of the entire laminate film.

DESCRIPTION OF THE PREFERRED EMBODIMENTS

Hereinafter, preferred embodiments of the present invention will be described along with the attached drawings. The present invention will be described by the following preferred embodiments. Changes can be made by a multiplicity of methods without departing from the scope of the present invention, and embodiments other than the embodiments can be used. Therefore, all changes within the scope of the present invention are included in the claims.

Here, in the drawings, portions which are indicated by the same reference numerals are the same elements which have the same functions. In addition, in the specification, in the case in which a numerical range is represented using "to", the numerical values of the upper limit and the lower limit which are represented by "to" are included in the numerical range.

The present inventors have conducted an intensive investigation of thickness unevenness of a cured layer and wrinkling of the entire laminate film regarding the laminate film manufacturing method. In the method of the related art, while a base film and a first mold film are supplied to a pair of rollers, an ultraviolet curable resin liquid is discharged toward the interval between the rotating rollers to sandwich the resin between the films. Since the rotating rollers vibrate, the thickness of the resin liquid layer to be applied becomes uneven. Therefore, there is a problem of low accuracy for the thickness of the cured layer. In addition, the cured layer does not support the laminate film and is irradiated with ultraviolet rays. Therefore, there is a problem of wrinkling of the laminate film due to the heat from the irradiation with ultraviolet rays. The present inventors have found these problems and completed the present invention.

The laminate film manufacturing method of the embodiment mainly includes a step of applying a coating solution including an active radiation curable resin to a surface of a first film that is continuously transported to form a coated film, a step of laminating a second film that is continuously transported on the coated film to sandwich the coated film between the first film and the second film, and a step of, in a state in which the coated film is sandwiched between the first film and the second film, winding any of the first film and the second film around a backup roller and irradiating the coated film with active radiation while continuously transporting the first film or the second film to cure the coated film so as to form a cured layer.

In the embodiment, a coated film having a predetermined thickness is formed on the first film and then the second film is laminated on the coated film. Thus, it is possible to prevent thickness unevenness of the coated film. In addition, when the coated film is irradiated with active radiation, in a state in which the coated film is sandwiched between the first film and the second film, any of the first film and the second film is wound around the backup roller and the film is continuously transported. Thus, it is possible to prevent wrinkling of the first film and the second film.

The laminate film manufacturing method of the embodiment will be described with reference to FIGS. 1 and 2. In the embodiment, the laminate film refers to a film having at least a structure in which a cured resin layer, which is cured by active radiation, is sandwiched between two films.

Figure 1:
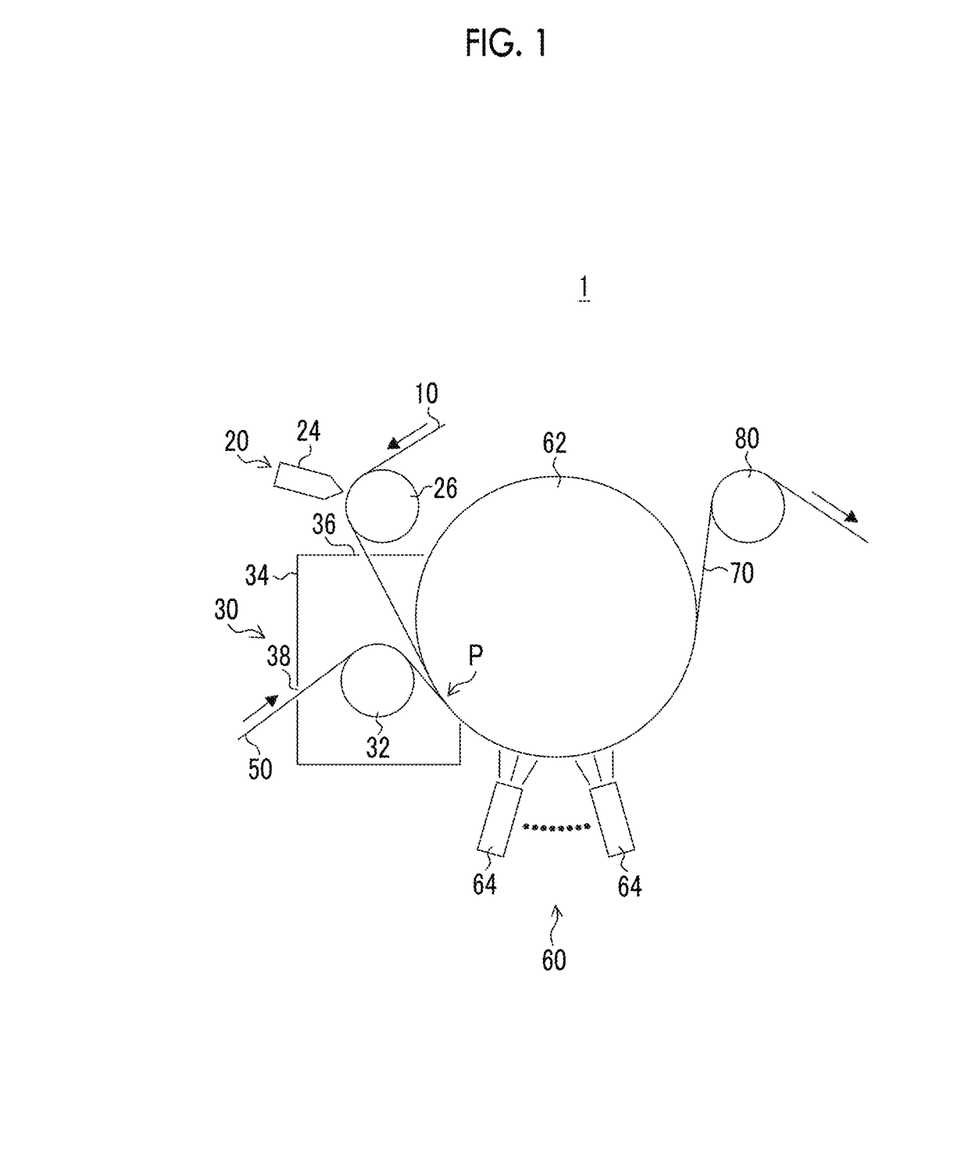
FIG. 1 is a diagram showing a schematic configuration of manufacturing equipment for a laminate film.
Figure 2:
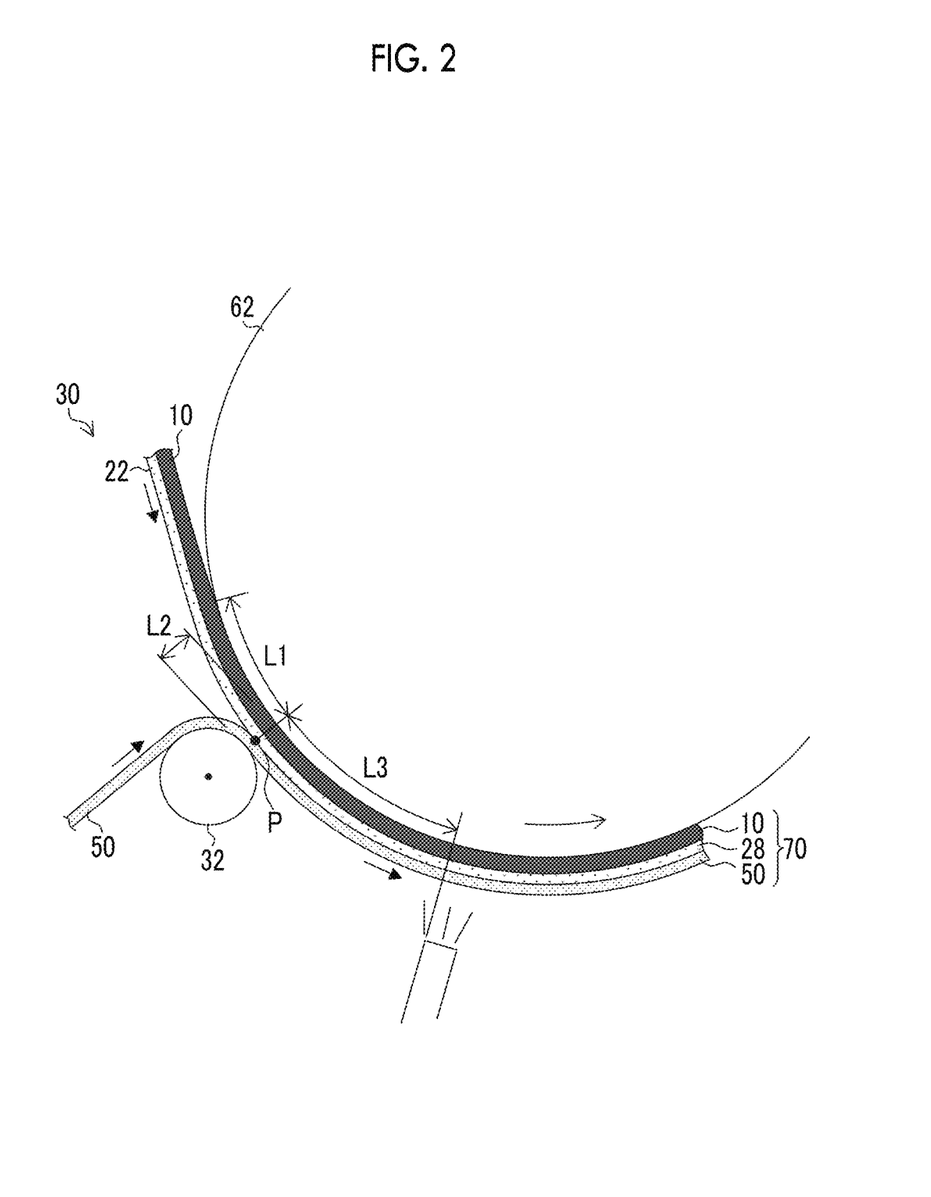
FIG. 2 is a partially enlarged diagram showing the manufacturing equipment for a laminate film.

FIG. 1 is a diagram schematically showing a manufacturing equipment 1 for a laminate film and FIG. 2 is an partially enlarged diagram showing the manufacturing equipment 1. First, a first film 10 is continuously transported from a feeding machine (not shown) to a application part 20. For example, the first film 10 is fed at a transport speed of 1 m/min to 50 m/min from the feeding machine. However, the transport speed is not limited to the above transport speed. When the film is fed, for example, a tension of 20 N/m to 150 N/m is applied to the first film 10. From the viewpoint of preventing wrinkling and scratches caused by film slip, the transport speed is preferably 30 N/m to 100 N/m.

The first film 10 has a first surface and a second surface, which are opposite to each other, and has a long shape. The distance between the first surface and the second surface of the first film 10, that is, the thickness is preferably 10 μm to 100 μm. The thickness of the first film 10 is more preferably 15 μm to 60 μm from the viewpoint of a demand for a thickness reduction of a product to which the film is applied and prevention of wrinkling. In addition, the first film 10 has a width of, for example, 300 mm to 1,500 mm. The thickness and the width of the first film 10 are appropriately selected according to the product to which the film is applied.

It is preferable for the first film 10 to use a film including at least one selected from cellulose acylate, cyclic olefins, acrylic resins, polyethylene terephthalate resins, and polycarbonate resins as a main component. The first film 10 has a function of protecting a coated film 22 and a cured layer 28, which will be described later, from oxygen and thus preferably has an oxygen transmission rate of $1.00 \times 10^{-4}$ to $1.00 \text{ cm}^3/(\text{m}^2 \cdot \text{day} \cdot \text{atm})$. From the viewpoint of the oxygen transmission rate, it is preferable that the first film 10 includes a polyethylene terephthalate resin as a main component. In order to achieve the above oxygen transmission rate, it is preferable to use a barrier film. The term "barrier film" includes the first film 10 and a barrier layer formed on the first surface or the second surface of the first film 10. In addition to the above resins used as a main component, for example, a plasticizer, an ultraviolet absorbent, and the like can be included in the first film 10.

In the application part 20, a coating solution including an active radiation curable resin is applied to the surface of the first film 10 that is continuously transported and thus the coated film 22 (refer to FIG. 2) is formed. In the application part 20, for example, a die coater 24 and a backup roller 26 arranged to be opposite to the die coater 24 are arranged. The surface opposite to the surface of the first film 10 on which the coated film 22 is formed is wound around the backup roller 26 and the coating solution is applied to the surface of the first film 10 that is continuously transported from the discharge port of the die coater 24 to form the coated film 22.

Here, the coated film 22 refers to a coating solution whose thickness is adjusted to be almost uniform and which is provided on the first film 10 before curing. The thickness of the coated film 22 is appropriately adjusted according to the product to which the film is applied. For example, the coated film 22 has a thickness of 10 μm to 80 μm. For example, the coated film 22 is formed to have a thickness within a range of the set thickness ±5%.

In the embodiment, as a coater, the die coater 24 adopting an extrusion coating method has been used but the coater is not limited thereto. Various coaters adopting various methods such as a curtain coating method, an extrusion coating method, a rod coating method, or a roll coating method can be used as long as the coated film 22 having a predetermined thickness can be formed.

The coating solution used in the application part 20 include an active radiation curable resin. The active radiation curable resin refers to a resin that is cured through a crosslinking reaction and a polymerization reaction by irradiation with ultraviolet rays. The active radiation refer to electromagnetic waves such as ultraviolet rays, electron beams, and radiation (such as α-ray, β-ray, and γ-ray). As the active radiation curable resin, for example, resins having a polyfunctional monomer and a polyfunctional oligomer that is curable by light (ultraviolet rays), electron beams, or radiation are used and among these, a resin having a photopolymerizable functional group is preferable. Examples of the photopolymerizable functional group include unsaturated polymerizable functional groups such as a (meth)acryloyl group, a vinyl group, a styryl group and an allyl group.

For the solvent of the coating solution, for example, an organic solvent can be used. Examples of the organic solvent include alcohols, ketones, esters, aliphatic hydrocarbons, amides, ethers, and ether alcohols. These solvents are preferably used in combination of two or more and more preferably used in combination of three or more.

The coating solution has a viscosity of, for example, 20 mPa·s to 600 mPa·s. From the viewpoint of preventing foaming and achieving thickness uniformity, the viscosity of the coating solution is preferably 40 mPa·s to 400 mPa·s.

A quantum dot can be added to the coating solution in addition to the active radiation curable resin. The quantum dot refers to nanoscale crystal particles of particles having optical properties due to the quantum confinement effect. As the quantum dot, for example, a quantum dot having a core-shell structure is known. Examples of core/shell pairs of the quantum dot having a core-shell structure include CdSe/ZnS, CdSe/CdS, CdTe/CdS, InP/ZnS, GaP/ZnS, Si/ZnS, and InN/GaN. However, the structure of the quantum dot is not limited to the core-shell structure. The optical properties can be changed by changing the size of the quantum dot. As the particle diameter of the quantum dot decreases, the amount of energy that the quantum dot emits increases. In addition, instead of the quantum dot, a quantum rod can be used. The quantum rod has the same properties as the quantum dot and refers to a particle having a narrow long shape. The quantum dot and the quantum rod can be used at the same time. The laminate film including the quantum dot and/or the quantum rod is also called a quantum dot film. Regarding the quantum dot, for example, paragraphs 0060 to 0066 of JP2012-169271A can be referred to. However, the quantum dot is not limited to the description of the above paragraphs. As the quantum dot, cosmetically available products can be used without any limitation. The light emitting wavelength of the quantum dot can be typically adjusted by controlling the composition and the size of the particles.

In the case of manufacturing a quantum dot film, it is preferable to use the method of the embodiment. For example, in the method of the related art, in the curing step, when a coated film is irradiated with active radiation, the temperature of the coated film increases. As the temperature increases, there arises a problem of scattering of heavy metals constituting the quantum dot. On the other hand, according to the embodiment, since the coated film 22 is sandwiched between the first film 10 and the second film 50, it is possible to cure the coated film 22 while preventing heavy metals in the coated film 22 from scattering.

In addition, since the coated film 22 is sandwiched between the first film 10 and the second film 50, the coated film can be less likely to be affected by oxygen when being cured. Accordingly, depending the type of the cured resin, purging with an inert gas (for example, nitrogen gas) is not required when the film is cured.

The first film 10 which has passed through the application part 20 and has the coated film 22 formed thereon is continuously transported to a lamination part 30. In the lamination part 30, the second film 50 which is continuously transported is laminated on the coated film 22 and thus the coated film 22 is sandwiched between the first film 10 and the second film 50.

The second film 50 to be laminated on the coated film 22 has a first surface and a second surface, which are opposite to each other, and has a long shape. The distance between the first surface and the second surface of the second film 50, that is, the thickness is preferably 10 μm to 100 μm. The thickness of the second film 50 is more preferably 15 μm to 60 μm from the viewpoint of a demand for a thickness reduction of a product to which the film is applied and prevention of wrinkling. In addition, the second film 50 has a width of, for example, 300 mm to 1,500 mm. The thickness and the width of the second film 50 are appropriately selected according to the product to which the film is applied. In order to prevent curling, it is more preferable to adjust the thickness to the thickness of the first film. In order to prevent curling, it is still more preferable to set the thickness of the second film 50 to be equal to the thickness of the first film 10.

It is preferable for the second film 50 to use a film including at least one selected from cellulose acylate, cyclic olefins, acrylic resins, polyethylene terephthalate resins, and polycarbonate resins as a main component. The second film 50 has a function of protecting the coated film 22 and the cured layer 28 from oxygen and thus preferably has an oxygen transmission rate of $1.00 \times 10^{-4}$ to $1.00$ cm$^3$/(m$^2$·day·atm). From the viewpoint of the oxygen transmission rate, it is preferable that the second film 50 includes a polyethylene terephthalate resin as a main component. In order to achieve the above oxygen transmission rate, it is preferable to use a barrier film. The term "barrier film" includes the second film 50 and a barrier layer formed on the first surface or the second surface of the second film 50. In addition to the above resins used as a main component, for example, a plasticizer, an ultraviolet absorbent, and the like can be included in the second film 50.

At least one of the first film 10 or the second film 50 may be a barrier film and may have an oxygen transmission rate of $1.00$ cm$^3$/(m$^2$·day·atm) or less. The oxygen transmission rate is a value measured under the conditions of a measurement temperature of 23° C. and a relative humidity of 90% using an oxygen gas transmission rate measuring device (trade name: OX-TRAN 2/20, manufactured by MOCON Inc.).

The barrier layer, that is, the barrier film, can be formed on the first film 10 and the second film 50 before or after the first film 10 is laminated on the second film 50. In consideration of a process loss, it is more preferable that the barrier layer is formed before lamination, that is, before an expensive coating solution is applied. It is preferable that the physical properties of the first film 10 and the second film 50, such as a Young's modulus and a thermal shrinkage, are the same to reduce wrinkling and curling occurring at the time of lamination or after lamination.

The barrier layer may include at least an inorganic film, and may be, for example, a barrier laminate including at least a single inorganic layer and at least a single organic layer.

The inorganic material constituting the inorganic film is not particularly limited and for example, metals, or various inorganic compounds such as inorganic oxides, and nitrides, oxynitrides can be used. As the element constituting the inorganic material, silicon, aluminum, magnesium, titanium, tin, indium, and cerium are preferable and the inorganic material may include one or two or more of these elements.

Among the above elements, as the barrier layer, an inorganic film including at least one compound selected from silicon nitride, silicon oxynitride, silicon oxide, and aluminum oxide is particularly preferable. Since the inorganic film composed of these materials exhibits satisfactory adhesiveness with an organic film, even in the case in which the inorganic film has pinholes, the pinholes can be effectively filled with the organic film and thus breakage can be prevented. Further, even in the case in which the inorganic film is laminated, an extremely satisfactory inorganic film can be formed and thus barrier properties can be further improved.

In addition, it is preferable that at least one of the first film 10 or the second film 50 is provided with a hard coat layer. Here, the hard coat layer refers to a layer having scratch resistance and having a scratch hardness (pencil method) (according to JIS K-5600 (1999) standards) (JIS: Japanese Industrial Standards) of H or higher. The scratch hardness is more preferably 2H or higher and most preferably 3H or higher.

The hard coat layer can be formed by applying a composition containing a compound having an unsaturated double bond, a polymerization initiator, as required, translucent particles, a fluorine-containing or silicone-based compound, and an organic solvent (hard coat layer forming material) to at least one of the first film 10 or the second film 50 directly or through another layer, and drying and curing the applied composition. Regarding the hard coat layer, for example, paragraphs 0162 to 0189 of JP2014-170130A can be referred to. However, the hard coat layer is not limited to the description of the above paragraphs.

In addition, it is preferable that at least one of the first film 10 or the second film 50 is provided with a light diffusing layer. The light diffusing layer refers to a layer for scattering light passing through the layer. The light diffusing layer can be formed by applying a coating solution containing translucent particles, a matrix forming component (monomers for a binder or the like), and an organic solvent to at least one of the first film 10 or the second film 50 directly or through another layer, and drying and curing the applied coating solution. Regarding the light diffusing layer, for example, paragraphs 0025 to 0099 of JP2009-258716A can be referred to. However, the light diffusing layer is not limited to the description of the above paragraphs.

In the lamination part 30, a laminate roller 32 and a heating chamber 34 surrounding the laminate roller 32 are arranged. In the heating chamber 34, an opening part 36 for allowing the first film 10 to pass therethrough and an opening part 38 for allowing the second film 50 to passé therethrough are provided.

A backup roller 62 is arranged at a position opposite to the laminate roller 32. In the first film 10 on which the coated film 22 is formed, the surface which is opposite to the surface on which the coated film 22 is formed is wound around the backup roller 62 and the first film is continuously transported to a laminate position P. The laminate position P refers to a position in which the second film 50 comes into contact with the coated film 22. It is preferable that before the first film 10 reaches the laminate position P, the film is wound around the backup roller 62. In the case in which the first film 10 is wrinkled, the wrinkling can be corrected before reaching the laminate position P by the backup roller 62 and removed. Accordingly, it is a distance L1 between the position in which the first film 10 is wound around the backup roller 62 (contact position) and the laminate position P is long and for example, the distance is preferably 30 mm or more. The upper limit is determined by the diameter of the backup roller 62 and the pass line.

In the embodiment, the second film 50 is laminated by the backup roller 62 and the laminate roller 32 used in the curing part 60. That is, the backup roller 62 used in the curing part 60 is also used as a roller to be used in the lamination part 30. In the lamination part 30, a roller for lamination can be arranged separately from the backup roller 62 so that the backup roller 62 is not used as a roller for lamination.

The number of rollers can be reduced by using the backup roller 62 used in the curing part 60 in the lamination part 30. In addition, the backup roller 62 can be also used as a heat roller for the first film 10.

The second film 50 fed out from the feeding machine (not shown) is wound around the laminate roller 32 and is continuously transported between the laminate roller 32 and the backup roller 62. The second film 50 is laminated on the coated film 22 formed on the first film 10 at the laminate position P. Accordingly, the coated film 22 is sandwiched between the first film 10 and the second film 50. The term "laminate" refers to stacking and laminating the second film 50 on the coated film 22.

A distance L2 between the laminate roller 32 and the backup roller 62 is preferably equal to or greater than a value of the total thickness of the first film 10, the cured layer 28 obtained by curing the coated film 22, and the second film 50. In addition, L2 is preferably equal to or less than a length obtained by adding 5 mm to the total thickness of the first film 10, the coated film 22, and the second film 50. By setting the distance L2 to be equal to or less than a length obtained by adding 5 mm to the total thickness, it is possible to prevent bubbles from entering between the second film 50 and the coated film 22. The distance L2 between the laminate roller 32 and the backup roller 62 refers to the shortest distance between the outer peripheral surface of the laminate roller 32 and the outer peripheral surface of the backup roller 62.

The rotation accuracy of the laminate roller 32 and the backup roller 62 is 0.05 mm or less and is preferably 0.01 mm or less at radial deflection. As the radial deflection decreases, the thickness distribution of the coated film 22 can be reduced.

When the second film 50 is laminated on the coated film 22, it is preferable that a difference between the tension applied to the first film 10 and the tension applied to the second film 50 is small and it is more preferable that the tensions are the same. Wrinkling can be prevented as the difference between the tensions decreases.

In addition, in order to prevent thermal deformation after the coated film 22 is sandwiched between the first film 10 and the second film 50, a difference between the temperature of the backup roller 62 of the curing part 60 and the temperature of the first film 10, and a difference between the temperature of the backup roller 62 and the temperature of the second film 50 are 30° C. or less, preferably 25° C. or less, and more preferably 15° C. or less. It is still more preferable that the temperatures thereof are the same.

The difference between the temperature of the backup roller 62 and the temperature of the first film 10 and the difference between the temperature of the backup roller 62 and the temperature of the second film 50 refer to a temperature difference when any of the first film 10 and the second film 50 comes into contact with the backup roller 62, and the temperate difference means the absolute value.

Since a temperature adjuster is generally provided for the temperature of the backup roller 62, the temperature of the temperature adjuster can be set to the temperature of the backup roller 62. In addition, the temperature of the first film 10 and the second film 50 can be directly measured by a noncontact temperature sensor, for example, a radiation thermometer.

In order to decrease the difference with the temperature of the backup roller 62, in the case in which the heating chamber 34 is provided, it is preferable that the first film 10 and the second film 50 are heated in the heating chamber 34. For example, in the heating chamber 34, the first film 10 and the second film 50 can be heated by supplying hot air from a hot air generating device (not shown).

In the case in which the first film 10 is wound around the backup roller 62 whose temperature is adjusted, it is preferable that the first film 10 is heated by the backup roller 62. Therefore, the temperature of the first film 10 can be adjusted to be the same as the temperature of the backup roller 62 in a relatively easy manner.

On the other hand, the second film 50 is separated from the backup roller 62. It is preferable that the heat the second film 50 is directly heated with the laminate roller 32 by using the laminate roller 32 as a heat roller. Then, it is possible to make the temperature of the second film 50 approach the temperature of the backup roller 62. However, the heating chamber 34 and the heat roller are not necessary and can be provided as required.

Next, in a state in which the coated film 22 is sandwiched between the first film 10 and the second film 50, the films are continuously transported to the curing part 60. In the curing part 60, the backup roller 62 and an ultraviolet irradiation device 64 arranged at a position opposite to the backup roller 62 as an active radiation irradiation device are provided. The first film 10 and the second film 50 between which the coated film 22 is sandwiched are continuously transported between the backup roller 62 and the ultraviolet irradiation device 64.

In the curing part 60, in a state in which the coated film 22 is sandwiched between the first film 10 and the second film 50, the first film 10 is wound around the backup roller 62 and is irradiated with ultraviolet rays from the ultraviolet irradiation device 64 as active radiation while being continuously transported. Then, the coated film 22 is cured to form the cured layer 28.

The cured layer 28 refers to a resin layer including a compound that can be cured by active radiation (active radiation curable resin) and obtained by curing the compound by active radiation.

In the embodiment, the first film 10 is wound around the backup roller 62 and continuously transported. However, the second film 50 can be wound around the backup roller 62 and continuously transported.

Winding of the first film or the second film around the backup roller 62 refers to a state in which any of the first film 10 and the second film 50 comes into contact with the surface of the backup roller 62 at a certain angle. Accordingly, while being continuously transported, the first film 10 or the second film 50 move in synchronization with rotation of the backup roller 62. The first film or the second film may be wound around the backup roller 62 at least during irradiation with ultraviolet rays.

The backup roller 62 is provided with a main body having a columnar shape and a rotation axis arranged at both end portions of the main body. The main body of the backup roller 62 has a diameter φ of, for example, 200 mm to 1,000 mm. The diameter φ of the backup roller 62 is not limited but considering the curling deformation of the laminate film, the equipment cost, and the rotation accuracy, the diameter φ is preferably 300 mm to 500 mm. Since the temperature adjuster is attached to the main body of the backup roller 62, the temperature of the backup roller 62 can be adjusted.

The temperature of the backup roller 62 is selected in consideration of heat generation at the time of irradiation with ultraviolet rays, a high curing efficiency of the coated film 22, and wrinkle deformation of the first film 10 and the second film 50 on the backup roller 62. The temperature of the backup roller 62 is preferably set within a temperature range of, for example, 10° C. to 95° C. and more preferably set within a temperature range of 15° C. to 85° C. By setting the temperature to 95° C. or lower, volatilization of a monomer such as acrylate from the coated film can be prevented. In addition, due to equipment limitation, the temperature is preferably set to 10° C. or higher.

Further, in the embodiment, in the curing part 60, a difference between the temperature of the first film 10 and the second film 50 before the coated film 22 is irradiated with ultraviolet rays as active radiation and the temperature of the first film 10 and the second film 50 after the coated film 22 is irradiated with ultraviolet rays is preferably 25° C. or less. By setting the temperature difference to 25° C. or less, wrinkling can be prevented.

In addition, the temperature of the first film 10 and the second film 50 is preferably equal to or lower than the glass transition temperature (Tg) thereof. By setting the temperature of the first film 10 and the second film 50 to be equal to or lower than the glass transition temperature of the respective films (first film 10 and second film 50), the stiffness of the first film 10 and the second film 50 can be prevented from being reduced. By maintaining stiffness of the first film 10 and the second film 50, wrinkling can be prevented.

Particularly, in the embodiment, a drying step is not provided after the coated film 22 is formed. In the case of not providing a drying step, the irradiation dose of ultraviolet rays with which the coated film 22 is irradiated increases. Therefore, the temperature of the film after irradiation with ultraviolet rays tends to increase compared to the temperature of the film before irradiation with ultraviolet rays. Accordingly, preventing the temperature of the first film 10 and the second film 50 from increasing before and after irradiation with ultraviolet rays is important to prevent wrinkling.

Here, a section before the coated film 22 is irradiated with active radiation refers to a section from the position at which the coated film is initially irradiated with active radiation to a position 0.5 m away from the position to the upstream side. A section after the coated film is irradiated with active radiation refers to a section from the position at which the coated film is finally irradiated with active radiation to a position 0.5 m away from the position to the downstream side. Here, the terms "upstream" and "downstream" are used for the movement (transport) direction of the first film 10 and the second film 50. A case in which the section is positioned in the movement (transport) direction with respect to a certain fixed point means that the section is positioned on the "downstream side" and the case in which the section is positioned in a direction opposite to the movement direction means that the section is positioned on the "upstream" side.

The temperature of the first film 10 and the second film 50 can be directly measured by a noncontact temperature sensor, for example, a radiation thermometer. The glass transition temperature of the first film 10 and the second film 50 can be measured according to JIS K7121 (1987).

The ultraviolet irradiation device 64 has a light source that generates ultraviolet rays. For example, as the light source that generates ultraviolet rays, a low pressure mercury lamp, an intermediate pressure mercury, a high pressure mercury lamp, an ultrahigh pressure mercury lamp, a carbon-arc lamp, a metal halide lamp, a xenon lamp and the like can be used.

The coated film 22 is irradiated with ultraviolet rays with an irradiation dose of, for example, 100 mJ/cm$^2$ to 10,000 mJ/cm$^2$ from the ultraviolet irradiation device 64. The irradiation dose of the ultraviolet rays can be set to be appropriate.

A distance L3 between the laminate position P and the ultraviolet irradiation device 64 is preferably 30 mm or more. Due to the rotation accuracy of the laminate roller 32 and the backup roller 62 and changes in tension of the first film 10 and the second film 50 immediately after the second film 50 is laminated on the coated film 22, thickness unevenness is likely to occur in the coated film 22. When the coated film is irradiated with ultraviolet rays from the ultraviolet irradiation device 64 in this state, thickness unevenness occurs in the cured layer 28 in some cases. It is preferable that the distance L3 between the laminate roller 32 and the ultraviolet irradiation device 64 is long. When the distance L3 is long, the thickness unevenness of the coated film 22 can be corrected before reaching the ultraviolet irradiation device 64.

The coated film 22 is formed into the cured layer 28 by irradiation with ultraviolet rays and a laminate film 70 including the first film 10, the cured layer 28, and the second film 50 is manufactured. The laminate film 70 is peeled off from the backup roller 62 using a peeling roller 80. The laminate film 70 is continuously transported to a winding machine (not shown) and then the laminate film 70 is wound around the winding machine into a rolled shape.

EXAMPLES

Next, the present invention will be specifically described with reference to examples. However, the present invention is not limited to these examples.

Example 1

As a first film, a polyethylene terephthalate (PET) film having a thickness of 50 μm and a width of 1,500 mm (trade name: A4300, Tg: 70° C., manufactured by Toyobo Co., Ltd.) was prepared and as a second film, a polyethylene terephthalate (PET) film having a thickness of 50 μm and a width of 1,500 mm (trade name: A4300, Tg: 70° C., manufactured by Toyobo Co., Ltd.) was prepared.

A coating liquid including an active radiation curable resin was prepared by the following formulation. The following quantum dot dispersion liquid was prepared and filtered though a polypropylene filter having a pore diameter of 0.2 μm. Then, the filtered solution was dried under reduced pressure for 30 minutes and used as a coating solution.

(Quantum Dot Dispersion Liquid)

| | |
|---|---|
| Toluene dispersion liquid of quantum dot 1 (maximum light emitting wavelength: 520 nm) | 10 parts by mass |
| Toluene dispersion liquid of quantum dot 2 (maximum light emitting wavelength: 630 nm) | 1 part by mass |
| Lauryl methacrylate | 2.4 parts by mass |
| Trimethylolpropane triacrylate | 0.54 parts by mass |
| Photopolymerization initiator (IRGACURE 819 (registered trade mark) (manufactured by Ciba Specialty Chemicals Inc.)) | 0.009 parts by mass |
| Viscosity-adjusting agent (Fumed silica AEROSIL (registered trade mark) R812 (manufactured by NIPPON AEROSIL CO., LTD.)) | 0.09 parts by mass |

As the quantum dots 1 and 2, having nanocrystals the following core-shell structure (InP/ZnS) were used.
Quantum dot 1: INP530-10 (manufactured by NN-labs)
Quantum dot 2: INP620-10 (manufactured by NN-labs)
The viscosity of the coating was 50 mPa·s.

While continuously transporting the first film at a rate of 1 m/min with a tension of 60 N/m, the coating solution from a die coater was applied to the surface of the first film to form a coated film having a thickness of 50 μm. Next, the first film on which the coated film was formed was wound around a backup roller and the second film was laminated on the coated film. In a state in which the coated film was sandwiched between the first film and the second film, while the films were wound around the backup roller and continuously transported, the films were irradiated with ultraviolet rays.

The diameter φ of the backup roller was 300 mm and the temperature of the backup roller was 50° C. The irradiation dose of ultraviolet rays was 2,000 mJ/cm². In addition, L1 was 50 mm, L2 was 1 mm, and L3 was 50 mm.

The coated film was cured by being irradiated with ultraviolet rays and the cured layer was formed to manufacture a laminate film. The thickness of the cured layer of the laminate film was 50±2 μm. The thickness accuracy of the cured layer was ±4%, which was satisfactory. In addition, when the laminate film was visually observed, wrinkling was not observed in the laminate film.

Example 2

A coating solution was prepared in the same manner as in Example 1 to prepare a first film and a second film. In Example 2, as a viscosity-adjusting agent, 0.3 parts by mass of fumed silica AEROSIL (registered trade mark) R812 (manufactured by NIPPON AEROSIL CO., LTD.) was used. The viscosity of the coating solution was 200 mPa·s. While the first film was continuously transported at a rate of 3 m/min with a tension of 60 N/m, the coating solution was applied to the surface of the first film from a die coater to form a coated film having a 70 μm. Next, the first film on which the coated film was formed was wound around a backup roller and the second film was laminated on the coated film. In a state in which the coated film was sandwiched between the first film and the second film, the films were wound around the backup roller and while the films were irradiated with ultraviolet rays while being continuously transported.

When the first film came into contact with the backup roller, the wrinkling situation was confirmed by changing a difference between the temperature of the backup roller and the temperature of the first film. The wrinkling was visually observed. In a case in which wrinkling could not be confirmed, this case was evaluated as A, and in a case in which wrinkling was confirmed, this case was evaluated as B. In Table 1, temperature conditions and evaluation results were shown. The temperature difference indicates the absolute value. The diameter φ of the backup roller was 300 mm.

TABLE 1

| Test | Temperature of backup roller [° C.] | Temperature of film [° C.] | Temperature difference [° C.] | Wrinkling evaluation |
|---|---|---|---|---|
| 2-1 | 40 | 10 | 30 | B |
| 2-2 | 40 | 15 | 25 | A |
| 2-3 | 40 | 65 | 25 | A |
| 2-4 | 40 | 70 | 30 | B |
| 2-5 | 60 | 30 | 30 | B |
| 2-6 | 60 | 35 | 25 | A |
| 2-7 | 60 | 65 | 5 | A |
| 2-8 | 60 | 90 | 30 | B |

As shown in Table 1, in Tests 2-1, 2-4, 2-5, and 2-8 in which the temperature difference was greater than 25° C., wrinkling was confirmed and in Tests 2-2, 2-3, 2-6, and 2-7 in which the temperature difference was 25° C. or less, wrinkling was not confirmed. Tests 2-1, 2-4, 2-5, and 2-8 in which wrinkling was confirmed meant that wrinkling was confirmed compared to Tests 2-2, 2-3, 2-6, and 2-7 in which wrinkling was not confirmed, and the level of the wrinkling was a level of not causing a problem as a product.

The wrinkling situation was confirmed by changing the difference between the temperature of the first film and the second film before the coated film was irradiated with ultraviolet rays and the temperature of the first film and the second film after the coated film was irradiated with ultraviolet rays. The wrinkling was visually confirmed. In a case in which wrinkling could not be observed, this case was evaluated as A, and in a case in which wrinkling was observed compared to A, this case was evaluated as B. In Table 2, temperature conditions and evaluation results are shown. The temperature difference indicates the absolute value.

TABLE 2

| Test | Temperature of backup roller [° C.] | Temperature of film (before irradiation) [° C.] | Irradiation dose of ultraviolet rays [mJ/cm$^2$] | Temperature of film (after irradiation) [° C.] | Temperature increase [° C.] | Wrinkling evaluation |
|---|---|---|---|---|---|---|
| 2-9 | 40 | 40 | 50 | 45 | 5 | A |
| 2-10 | 40 | 40 | 100 | 47 | 7 | A |
| 2-11 | 40 | 40 | 300 | 52 | 12 | A |
| 2-12 | 40 | 40 | 600 | 58 | 18 | A |
| 2-13 | 40 | 40 | 1200 | 65 | 25 | A |
| 2-14 | 40 | 40 | 2400 | 75 | 35 | B |

As shown in Table 2, in Test 2-14 in which the temperature increase was greater than 25° C., the wrinkling was confirmed. In Tests 2-9, 2-10, 2-11, 2-12, and 2-13 in which the temperature increase was 25° C. or less, the wrinkling was not confirmed. Test 2-14 in which wrinkling was confirmed meant that wrinkling was confirmed compared to Tests 2-9, 2-10, 2-11, 2-12, and 2-13 in which wrinkling was not confirmed and the level of the wrinkling was a level of not causing a problem as a product.

EXPLANATION OF REFERENCES

1: Manufacturing equipment
10: First film
20: Application part
22: Coated film
24: Die coater
26: Backup roller
28: Cured layer
30: Lamination part
32: Laminate roller
34: Heating chamber
50: Second film
60: Curing part
62: Backup roller
64: Ultraviolet irradiation device
70: Laminate film
80: Peeling roller

What is claimed is:

1. A laminate film manufacturing method comprising at least:
   a step of applying a coating solution including an active radiation curable resin to a surface of a first film that is continuously transported to form a coated film;
   a step of winding the first film on a backup roller and laminating a second film that is continuously transported on the coated film on the first film with a laminate roller to sandwich the coated film between the first film and the second film; and
   a step of, in a state in which the coated film is sandwiched between the first film and the second film, winding a surface side of the first film on the backup roller and irradiating the coated film with active radiation while continuously transporting the sandwiched coated film to cure the coated film so as to form a cured layer,
   wherein a distance between a position where the first film is wound on the backup roller and a position where the second film is brought into contact with the coated film is 30 mm or more.

2. The laminate film manufacturing method according to claim 1,
   wherein a difference between a temperature of the first film and the second film before the coated film is irradiated with the active radiation and a temperature of the first film and the second film after the coated film is irradiated with the active radiation is 25° C. or less.

3. The laminate film manufacturing method according to claim 1,
   wherein when any of the first film and the second film comes into contact with the backup roller, a difference between a temperature of the backup roller and a temperature of the first film or a difference between the temperature of the backup roller and the temperature of the second film is 25° C. or less.

4. The laminate film manufacturing method according to claim 1,
   wherein a temperature of the first film and the second film is equal to or lower than the glass transition temperature thereof.

5. The laminate film manufacturing method according to claim 1,
   wherein at least one of the first film or the second film is a barrier film provided with a barrier layer, and the barrier film is provided with a barrier layer having an oxygen transmission rate of 1.00 cm$^3$/(m$^2$·day·atm) or less.

6. The laminate film manufacturing method according to claim 5,
   wherein the barrier layer is an inorganic film including at least one compound selected from silicon nitride, silicon oxynitride, silicon oxide, and aluminum oxide.

7. The laminate film manufacturing method according to claim 1,
   wherein at least one of the first film or the second film is provided with a hard coat layer.

8. The laminate film manufacturing method according to claim 1,
   wherein the coating solution includes at least one of a quantum dot or a quantum rod.

9. The laminate film manufacturing method according to claim 1,
   wherein at least one of the first film or the second film is provided with a light diffusing layer.

10. The laminate film manufacturing method according to claim 1,
    wherein a viscosity of the coating solution is within a range of 40 mPa·s to 400 mPa·s.

11. The laminate film manufacturing method according to claim 1,
    wherein a distance between a position where the second film is brought into contact with the coated film and a position where the active radiation is irradiated is 30 mm or more.

12. The laminate film manufacturing method according to claim 1, wherein a distance between the backup roller and the laminate roller is less than or equal to a total thickness of the first film, the cured layer and the second film.

13. The laminate film manufacturing method according to claim 1,
wherein a distance between the backup roller and the laminate roller is less than or equal to a value obtained by adding 5 mm to a total thickness of the first film and the coated film.

* * * * *